Oct. 16, 1962 R. SCHMID ETAL 3,058,149
MOTOR DRIVEN, MANUALLY OPERATED TOOL
FOR REMOVING MEAT FROM BONES
Filed May 23, 1960

INVENTORS
RICHARD SCHMID
WALTER WEZEL

BY *[signature]*

ATTORNEY.

United States Patent Office 3,058,149
Patented Oct. 16, 1962

3,058,149
MOTOR DRIVEN, MANUALLY OPERATED TOOL
FOR REMOVING MEAT FROM BONES
Richard Schmid and Walter Wezel, Maulbronn, Germany, assignors to Firma Schmid & Wezel, Maulbronn, Germany, a corporation of Germany
Filed May 23, 1960, Ser. No. 30,820
Claims priority, application Germany Aug. 8, 1959
5 Claims. (Cl. 17—1)

The present invention relates to a motor driven, manually operated tool for removing meat from bones in general and to such tool having a hand piece receiving the driving shaft, in particular.

It is one object of the present invention to provide a motor-driven manually operated tool for removing metal from bones which comprises a hand piece and a rotating bell-shaped knife the axis of which is disposed at an angle to the axis of the hand piece and mounted at the head end of the hand piece, and which defines an opening receiving a stripping means rigidly secured to the hand piece oppositely the knife.

The present invention provides thus in an advantageous manner a tool by which meat particles are removed mechanically from bones. The tool designed in accordance with the present invention simplifies appreciably the removal of meat from bones and the labor required for this task is measurably reduced. The present invention avoids the dangerous and cumbersome scratching off the meat from bones by means of manual knives.

In order to avoid that during the working with the tool cut off meat particles are thrown about, the stripping means may be equipped advantageously with an obliquely disposed directing face, along which the meat particles which have been cut off slide along. Under certain, circumstances the direction of the oblique face may be extended to an angle of about 120°. This expedient leads to the result that the mass of cut off meat accumulates adjacent the working place. It is, however, a condition, that no space is provided between the knife and the stripping means. This is brought about in accordance with the present invention by an arrangement according to which the stripping means engage tightly the inner face of the knife. In addition the stripping means may suitably partly overlie the knife.

The result of the work obtained with the tool designed in accordance with the present invention may advantageously be still improved by covering up the inner space of the knife at those places which do not perform the cutting by suitable means, so that inside of the knife no movable parts are present with the exception of the cutting portion thereof. This is brought about in accordance with the present invention by connecting the stripping means with a covering disk, which engages the inside of the bottom of the knife. This covering disk may be formed as independent element or may be formed integrally with the stripping means.

It is another object of the present invention to provide a motor driven, manually operated tool for removing meat from bones wherein the total strippling means may be put up and may then be cleaned. This is made possible in such a manner that the stripping means are swingably mounted on the hand piece, if necessary, jointly with the covering disk. In order to make this possible, the stripping means may be equipped with a nose extension and a slot and may be guided through the latter for instance by means of a screw bolt mounted in two lugs of the hand piece.

It is yet another object of the present invention to provide a motor-driven, manually operated tool for removing meat from bones wherein in addition to knives having a cylindrical enveloping face, also bell-shaped knives having an enveloping face like a truncated cone can be used, whereby the inner span of the knife may be decreasing or increasing towards the cutting edge.

With these and other objects in view, which will become apparent in the following detailed description, the present invention will be clearly understood in connection with the accompanying drawing, in which.

Figure 1:
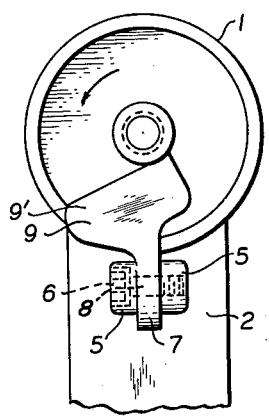
FIGURE 1 is an elevation of the hand tool, designed in accordance with the present invention, looking towards the knife opening.
Figure 2:
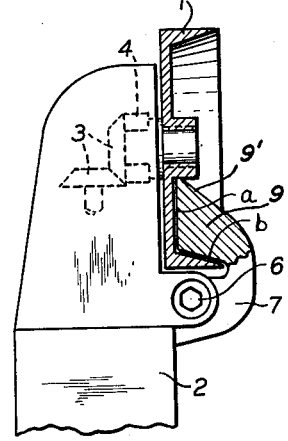
FIG. 2 is a side elevation thereof, partly in section.

Referring now to the drawing and in particular to FIGS. 1 and 2, a bell-shaped knife 1 is mounted on a hand piece 2, the latter receiving a driving shaft (not shown) for instance a flexible shaft. A bevelled gear drive 3 disposed in the head portion of the hand piece 2, and one of the bevelled gears carries an axle for the bell-shaped knife 1, which turns in the direction of the arrow (FIG. 1).

Two lugs 5 are secured to the hand piece 2, and a screw-bolt having a recessed hexagon 6 is mounted in the two lugs 5. The stripping member 9 has a nose extension 7, which has a slot 8 and which is disposed between the lugs 5, the stripping member 9 being equipped with an oblique directing face 9'. The screw-bolt 6 projects through the slot 8 of the nose extension 7. The screw-bolt 6 permits a loosening of the securing of the stripping member 9, whereupon the latter may be moved out from the knife 1 in order to clean the same.

As may be ascertained from FIG. 2, the stripping member 9 is formed and disposed in such a manner that no spaces occur at the faces a and b and the stripping member 9 engages thus tightly the inner faces a and b of the bell-shaped knife 1 at a distance that no meat particles and tendons can be accumulated therein.

Figure 3:
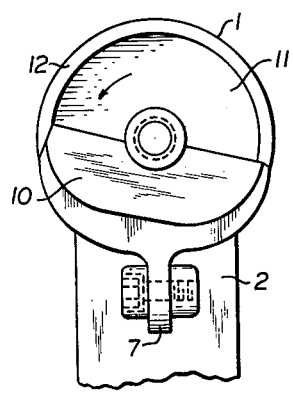
FIG. 3 is an elevation of a second embodiment of the hand tool.
Figure 4:
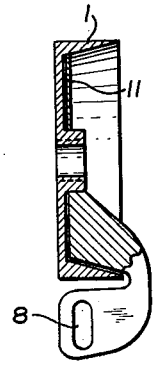
FIG. 4 is a side elevation of the stripping means shown in FIG. 3, partly in section.
Figure 4A:
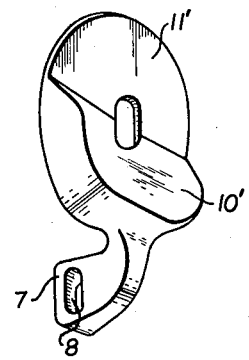
FIG. 4a is a perspective elevation of a third embodiment of the stripping means.

Referring now to FIGS. 3, 4 and 4a, a tool is disclosed having another embodiment of the stripping member 10. The stripping member 10 is connected with a covering disk 11. The latter covers completely the bottom face of the bell-shaped knife 1 so that only the portion 12 constitutes the cutting portion of the knife 1. The covering disk 11 may consist for instance of a particular sheet metal disk (FIG. 4), or the covering disc 11' can be integrally connected with the stripping member 10' as clearly shown in FIG 4a. The latter structure of the stripping member 10' bring about the best working result, since due to the immovable cover of the greater part of the bell-shaped knife 1, no meat particles may be thrown out and the cutting efficiency is also increased.

Figure 5:
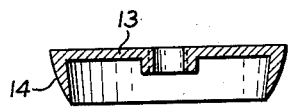
FIG. 5 is an axial section of another embodiment of the knife.

Referring now to FIG. 5 of the drawing, another embodiment of the bell-shaped knife having a conical shape of its envelope 14 is shown. It is of particular importance that the outer conical face of the knife 13 is of ball- or spherical-shape. The stripping member can be applied to the knife 13 in the same manner as disclosed in connection with the first embodiment of the knife 1, since the slot 8 provided in the nose extension of the stripping member permits likewise a swinging out and exact insertion, respectively, in the knife.

While we have disclosed several embodiments of the present invention, it is to be understood that these embodiments are given by example only and not in

We claim:

1. A motor driven, manually operated tool for removing meat from bones, comprising a hand-piece, a bell-shaped knife rotatably mounted in said hand-piece, driving means for said knife disposed in said hand-piece, the rotating axis of said knife forming an angle to the longitudinal axis of said hand-piece, and an immovable stripping member secured to said hand-piece and projecting into said knife, said stripping member having an outer directing face disposed obliquely toward the inner bottom face of said knife, said stripping member engaging said inner bottom face of said knife, and covering one part of the inner bottom face of said knife, and a covering dish connected with said stripping member and disposed nonrotatably opposite the other part of the inner bottom face of said knife.

2. The tool, as set forth in claim 1, wherein said stripping member is pivotally secured to said hand-piece.

3. The tool, as set forth in claim 2, wherein said stripping member has a nose extension, the latter defining a longitudinal slot, and said hand-piece has two lugs spaced apart from each other projecting therefrom, said nose extension being received between said lugs, and a screw-bolt extending through said lugs and through said nose extension, to secure pivotally said stripping member to said hand-piece.

4. The stool, as set forth in claim 1, wherein said knife has a lateral face conforming to a truncated cone having a ball-shaped outer face.

5. The tool, as set forth in claim 1, wherein said knife has lateral face conforming to a truncated cone having a spherically-shaped outer face.

References Cited in the file of this patent

UNITED STATES PATENTS

| | | |
|---|---|---|
| 540,438 | Harris | June 4, 1895 |
| 1,154,713 | Meyer | Sept. 28, 1915 |
| 2,827,657 | Bettcher | Mar. 25, 1958 |